Nov. 20, 1951 J. V. L. HOGAN 2,575,959

FACSIMILE RECORDER CONSTRUCTION

Filed Aug. 10, 1946

JOHN V. L. HOGAN
INVENTOR

BY Alfred W. Barber
ATTORNEY

Patented Nov. 20, 1951

2,575,959

UNITED STATES PATENT OFFICE 2,575,959

FACSIMILE RECORDER CONSTRUCTION

John V. L. Hogan, Forest Hills, N. Y., assignor to Faximile, Inc., New York, N. Y., a corporation of Delaware Application August 10, 1946, Serial No. 689,793

2 Claims. (Cl. 346—101)

This invention pertains to electronic facsimile recorders, and more particularly to a novel facsimile recording machine adapted for use with electrolytic recording paper.

One object of the present invention is to provide a novel facsimile recorder of simplified construction.

Another object of the invention is to provide a facsimile recorder in which the electrolytic record sheet may be quickly and easily removed or inserted in the machine.

Another object is to provide a facsimile recorder which may have the record sheet easily inserted therein and all of the complemental components will come automatically into registry without necessitating adjustment of the various members.

A further object of the invention is to provide a facsimile recorder having a humidor compartment with self-registering components so that when the record sheet roll is placed in the humidor compartment and the paper placed across certain of the members in the recorder the closure of the humidor compartment will automatically bring all of the complemental components into the desired position for operating the recorder.

A further object is to provide a facsimile recorder having a humidor compartment with a transversely hinged closure member with registry means for determining the space between the free edges of the closure portions to establish the space for proper egress of the record sheet from the humidor compartment.

A further object of the invention is to provide a facsimile recorder utilizing a humidor compartment and having self-registering complemental members therein with locking means for maintaining said components in a predetermined relationship during operation of the recorder.

Another object is to provide a facsimile recorder having the essential members carried by two major frames which may be hingedly connected and each frame having guide means for automatically registering the various complemental members in a single operation, the members being disposed on their respective frames so that the usual step of threading the record sheet between the complemental members is not required.

Other objects may become apparent, and it is intended that the drawings are for the purpose of illustration only, and that the invention not be limited except by the scope of the subjoined claims.

The art of facsimile recording includes the steps of utilizing a modulated signal to reproduce point by point and line by line the varying densities of an original picture, text, or other graphic material. One of the ways in which this may be accomplished is by drawing an electrolytic sensitive record sheet or carrier across a rotating helical electrode and under an intersecting metallic linear electrode. The intersection of the linear electrode through the electrolytic recording sheet upon the helical electrode forms a scanning point which moves across the paper from side to side and a steady motion of the paper completes the scanning operation. The required markings of variable density are produced by passing the facsimile signals of proper intensity between the linear and helical electrodes through the electrolytic recording sheet.

In one form of the invention, the essential components of such a recording machine are a humidor compartment for holding the electrolytic recording sheet and maintaining the desired moisture content prior to recording, a helical electrode and means for rotating it, a linear marking electrode, and drive rollers for advancing the record sheet at the desired rate. These components are disposed so that a part of that humidor, the helical electrode and its driving means, and the paper pulling roller lie beneath the recording sheet and another portion of the humidor, the linear electrode, and a complementary driving roller lie above the recording sheet.

In order to insert or remove the roll of electrolytic recording paper or sheet in conventional electronic facsimile equipment, it is necessary to open the humidor compartment, raise the linear electrode, and raise the upper paper advancing roller, and after the insertion or removal of the sheet to replace all these elements in the proper positions and often to vary the adjustments so that the proper recording conditions are obtained.

The present invention contemplates a considerable improvement and simplification by making the recording scanner in two parts, the lower part comprising a portion of the humidor, the helical electrode and its driving means, and one of the driving rolls, while the upper part comprises the upper portion of the humidor, the linear electrode, and the cooperative driving roll. Additional means may be carried by the upper part, as well, such as a paper guiding device and a paper tensioning device. The two parts are hinged at one end so that lifting the upper part removes the upper cooperating drive roll, the linear electrode, the guide member and the upper part of the humidor allowing the recording sheet to be brought into vision and laid over the lower mechanism. The upper roll, linear electrode, paper guide means and tensioning means are mounted and preadjusted in such a manner that when the upper portion of the recorder is lowered and placed over the recording sheet all adjustments are set for instantaneous resumption of recording.

It will be seen that this machine is particularly advantageous when using recording paper that is easily distorted or torn, so that when the usual threading operation is eliminated in this manner the paper may be inserted in the recorder quickly and accurately without damage to the paper.

The invention may be more fully understood and appreciated from the detailed descriptions and the various figures of the drawings.

Figure 1:
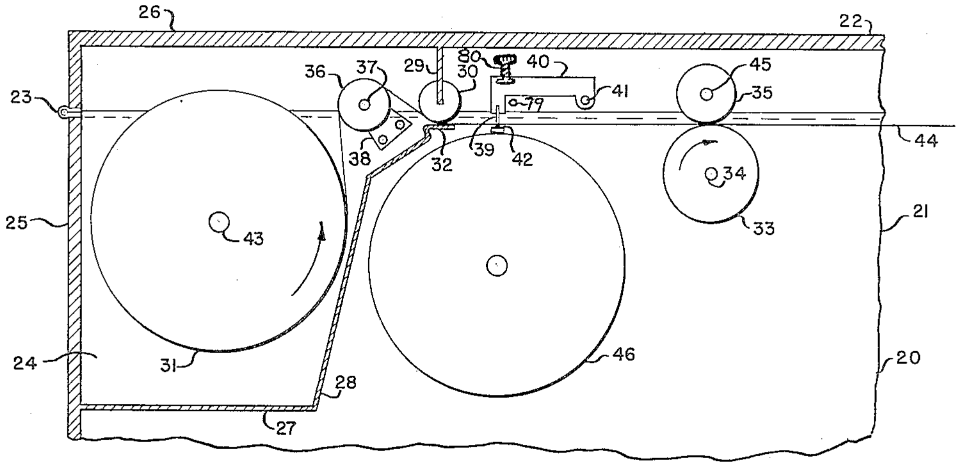
Fig. 1 is a fragmentary sectional side view of one form of the invention showing the upper and lower frames hingedly connected with the various complemental members in registry for operation of the recorder.

Referring to the drawings, and more particularly to Fig. 1, a section of the recorder 20 is shown having a base portion 21 and a cover 22, hinged at 23. A humidor 24 is partially formed by the end wall 25 and a portion 26 of the cover 22.

Internally of the recorder, the humidor is completed by lower wall 27 and a side wall 28 on the base unit 21, which extends substantially the width of the recorder. The cover 22 has a guide support 29 which is secured to the cover 22, while the free end of the guide support 29 is shown having a paper guide 30. The paper guide may be circular in cross-sectional shape as shown, and at least the full width of the record sheet.

The guide support and the humidor lower wall 27 and side wall 28, respectively, along with the portions 25 and 26 of the recorder form a complete envelope about the roll of recording paper 31 with the exception of the slot between the lower edge of the paper guide 30 and the paper guide lip 32 for preventing rapid evaporation of moisture from the recording paper.

A drive roll 33 is revolubly mounted at 34 between the side frames of the base portion 21. A take-off roll 36 is pivotly mounted at 37 to a support member 38, these supports are connected to opposing side frames of the base portion 21 so that the record sheet take off path may be determined precisely regardless of the size of the paper roll 31.

The linear electrode 39 is carried by a printer blade holder 40, which holder is pivoted at 41 so that the linear electrode will press against the record sheet 44 which sheet engages the helical electrode 42. Stop 79 may be provided to prevent the electrode from dropping out of place when the cover is raised. A linear electrode predetermined pressure adjustment is provided, for instance, knurled adjusting screw 80 which may be set and once set its effect will not be changed upon replacing the paper. Linear electrode 39 is preferably a flexible electrode as shown and described in U. S. Patents Nos. 2,202,855 and 2,380,467 in order to obtain the full advantages of the present invention.

As shown in Fig. 1, the roll of record sheet 31 is revolubly mounted on a shaft 43, in any suitable manner, within the humidor 24, and in the present instance, shaft 43 is shown carried by the base portion 21. The record sheet per se 44, is shown coming off the roll 31 and going over the top of the take-off roll 36, then passing between the paper guide 30 and the humidor lip 32. The paper then extends between the linear electrode 39 and the helical electrode 42 and passes on between the drive roll 33 and the upper drive roll 35, the latter being mounted on a shaft 45 between side portions of the cover 22. The relative position of rolls 33 and 35 is adjustable by suitable means not shown. The mechanism (not shown) for rotating the drive roll 33 may be of any conventional or suitable type provided it will cause the paper 44 to be drawn between the drive roll 33 and the upper roll 35, thereby causing the record sheet to be unwound from the roll 31 at the proper rate.

The upper portion of the take-off roll 36 is higher than the lower edge of the paper guide 30 so that the record sheet will be pressed against the paper guide 30 and not against the paper guide lip 32.

The record sheet in the immediate area of the linear electrode is at right angles to a vertical line drawn through the center of the helix drum 46 so that a pressure of the linear electrode against the paper will provide engagement of the underside of the record sheet with the helical electrode 42 to permit electrical energy to pass between said linear and helical electrode through the electrolytic recording sheet.

Figure 5:
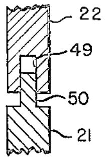
Figs. 5, 6 and 7 are fragmentary cross sections of various guide means used for maintaining the upper and lower frames in accurate registry.
Figure 6:
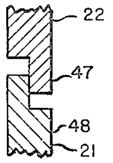
Figure 7:
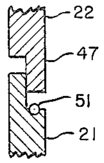

Figs. 5, 6 and 7 are various forms of engaging edges of the cover 22 and the base portion 21.

Fig. 6 is a preferred form, shown in cross-section, of the guide edges 47 and 48, respectively. These guide edges go substantially completely around the peripheral edges of the cover 22 and the base unit 21 where the two members engage, with the exception of the area around the hinge 23, and a slot through which the record sheet emerges from the rear of the recorder. The slot is not specifically shown but it is to be understood that any suitable slot may be used.

Fig. 7 is somewhat similar to Fig. 6 with a resilient member 51 mounted as shown as an additional means for sealing the cover against the base portion 21 to prevent dust from entering the recorder where the cover and base unit come together.

These guide means are provided so that once the adjustments of the various elements have been made they will be brought back accurately to their original positions whenever cover 22 is closed.

Figure 2:
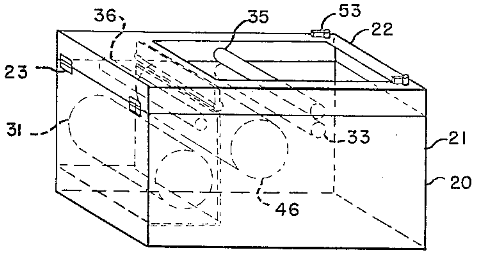
Fig. 2 is a perspective view of a recorder framework according to one form of the present invention locked in operative position with certain of the internal members shown dotted to indicate their relative positions.

Fig. 2 is a perspective view of the recorder 20 having character references similar to those shown for Fig. 1. In Fig. 2 the locking means is shown having handles 53 for securing the cover 22 to the base unit 21 after the cover is moved into operative position, against the base.

Figure 4:
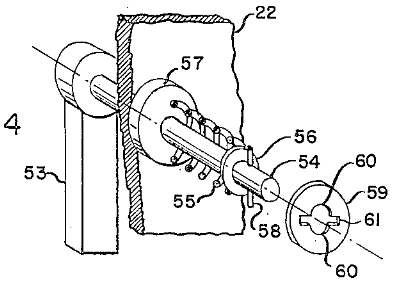
Fig. 4 is a fragmentary perspective view of one form of locking means for holding the upper and lower frames in a predetermined position.

Fig. 4 shows one convenient form of locking means with the locking handles 53 connected to a shaft 54, which shaft is inserted through the cover 22, with a spring 55 inserted between the washer 56 and the collar 57. A pin 58 is secured to the shaft 54 so that the expansion of the spring 55 will keep the handle 53 against the surface of the cover 22. A slotted member 59 is secured to the base portion 21, said washer having camming surfaces in the area 60 so that when the handle 53 is rotated the pin 58 will fit into the slot 61 and by turning the handle to the vertical position shown in Fig. 4, the pin 58 will ride on the camming surfaces 60 on the underneath side of the slotted member 59, thereby drawing the cover into secure relation with the base portion 21 under action of the spring 55 and thereby locking the cover into fixed engagement with the base portion of the recorder.

While one form of locking means is shown, it is to be understood that any conventional or suitable means may be used for holding the cover and base portion in fixed relation so that there will be complete registry of the various members supported by the cover and base portion when the recorder is in operative condition.

Figure 3:
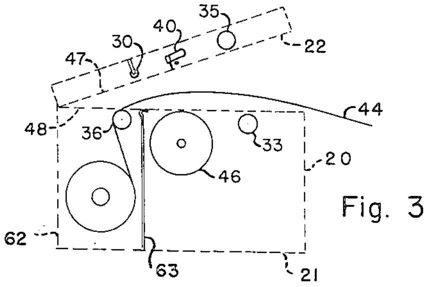
Fig. 3 is a side view of the essential elements of the recorder of Fig. 2 shown with the frames dotted to indicate that the record sheet may be placed in the machine without the necessity of the conventional threading.

Fig. 3 is a side view of the recorder 20 shown dotted having the cover 22 raised from the base portion 21. The various essential elements have character references corresponding to parts as shown in Fig. 1.

The humidor compartment 62 is shown having a side wall 63, which extends substantially the full internal height of the base portion. The purpose of this view is to show that the recording sheet roll 31 may be inserted in the humidor and that the record sheet 44 is simply extended over the top of the various elements in the base portion and permitted to protrude through the slot in the rear of the recorder. When the cover 22 engages the base portion 21 as shown in Fig. 2, there will be complete registry of the various elements due to the guide edges 47 and 48 in conjunction with the hinge 23. While hinges 23 have been shown connecting cover 22 and base portion 21 it will be understood that this is a convenient form but that all the other objects of the invention may be accomplished without them. Even with the cover entirely removable the registry means will correctly position it when it is replaced.

When the cover is locked to the base portion, the upper roll 35 will press the paper 44 against the drive roll 33. The record sheet 44 will be drawn upwardly against the paper guide 30 by action of the upward pressure of the take-off roll 36. The resiliently mounted horizontal electrode 39 will engage the upper surface of the record sheet against the helical electrode 42 in a manner well known in the art.

From the foregoing it will be seen that the cover may be substantially sealed and locked to the base portion of the recorder except for a slot of conventional type through which the record sheet emerges in the rear portion of the recorder. Further, the humidor per se is completely sealed apart from the rest of the recorder except for the small slot between the paper guide 30 and the paper guide lip, such as 32.

What is claimed is:

1. A facsimile recorder for recording on moist electrolytic paper from a supply roll, comprising, in combination: a base portion and a cover hinged thereto, cooperating partitions in the base portion and the cover completing a humidor compartment for the paper supply roll when the cover is closed, the contiguous edges of said partitions being adapted for the withdrawal of paper therebetween, a helical electrode rotatably mounted in the base portion and a cooperating linear electrode mounted in the cover, a drive roll in the base portion and a cooperating roll in the cover, said drive roll being operative to draw paper from the humidor compartment past and between said helical and linear electrodes, whereby the recorder easily may be loaded with paper when the cover is open.

2. A facsimile recorder for recording on moist electrolytic paper from a supply roll, comprising, in combination: a base portion and a cover hinged thereto, cooperating partitions in the base portion and the cover completing a humidor compartment for the paper supply roll when the cover is closed, the contiguous edges of said partitions being adapted for the withdrawal of paper therebetween, a recording electrode mounted in the base portion and a cooperating electrode mounted in the cover, a drive roll in the base portion and a cooperating roll in the cover, said drive roll being operative to draw paper from the humidor compartment past and between said recording electrodes, whereby the recorder easily may be loaded with paper when the cover is open.

JOHN V. L. HOGAN.

REFERENCES CITED

The following references are of record in the file of this patent:

UNITED STATES PATENTS

| Number | Name | Date |
|---|---|---|
| 2,227,109 | Shankweiler | Dec. 31, 1940 |
| 2,251,998 | Goodale | Aug. 12, 1941 |
| 2,282,924 | Artzt | May 12, 1942 |
| 2,391,765 | Artzt | Dec. 25, 1945 |
| 2,421,673 | Young | June 3, 1947 |

FOREIGN PATENTS

| Number | Country | Date |
|---|---|---|
| 469,272 | Great Britain | July 22, 1937 |